US011112016B2

(12) United States Patent
Wiktorko et al.

(10) Patent No.: US 11,112,016 B2
(45) Date of Patent: Sep. 7, 2021

(54) TRIGGER MECHANISM FOR A VALVE ASSEMBLY

(71) Applicant: Goodrich Corporation, Charlotte, NC (US)

(72) Inventors: Łukasz Wiktorko, Wrocław (PL); Paweł Czarnecki, Wrocław (PL)

(73) Assignee: GOODRICH CORPORATION, Charlotte, NC (US)

( * ) Notice: Subject to any disclaimer, the term of this patent is extended or adjusted under 35 U.S.C. 154(b) by 287 days.

(21) Appl. No.: 16/414,069

(22) Filed: May 16, 2019

(65) Prior Publication Data
US 2020/0056708 A1 Feb. 20, 2020

(30) Foreign Application Priority Data

Aug. 17, 2018 (EP) ..................................... 18461600

(51) Int. Cl.
| | | |
|---|---|---|
| F16K 31/06 | (2006.01) | |
| F16K 7/04 | (2006.01) | |
| F16K 3/02 | (2006.01) | |
| F16L 55/136 | (2006.01) | |
| F16K 31/08 | (2006.01) | |
| F16K 3/02 | (2006.01) | |
| F16L 55/136 | (2006.01) | |
| F16K 31/08 | (2006.01) | |

(Continued)

(52) U.S. Cl.
CPC ............ *F16K 7/045* (2013.01); *F16K 3/0272* (2013.01); *F16K 31/06* (2013.01); *F16L 55/136* (2013.01);

(Continued)

(58) Field of Classification Search
CPC ........ F16K 7/045; F16K 3/0272; F16K 31/06; F16K 17/04; F16K 17/403; F16K 31/084;
(Continued)

(56) References Cited

U.S. PATENT DOCUMENTS

| | | | | |
|---|---|---|---|---|
| 4,475,664 A | * | 10/1984 | Mackal | ..................... B63C 9/24 222/5 |
| 4,805,802 A | | 2/1989 | MacKendrick et al. | |
| 4,896,728 A | * | 1/1990 | Wolff | ..................... F03G 7/065 169/37 |
| 4,959,034 A | * | 9/1990 | Wass | ......................... B63C 9/24 441/41 |

(Continued)

FOREIGN PATENT DOCUMENTS

| | | |
|---|---|---|
| CN | 106593811 A | 4/2017 |
| CN | 206522509 U | 9/2017 |

(Continued)

OTHER PUBLICATIONS

Extended European Search Report for International Application No. 18461600.1 dated Feb. 22, 2019, 5 pages.

*Primary Examiner* — Craig J Price
(74) *Attorney, Agent, or Firm* — Cantor Colburn LLP

(57) ABSTRACT

A valve assembly is provided, the valve assembly comprising a body that defines a fluid flow path between an inlet and an outlet with a frangible member between the inlet and the outlet across the fluid flow path so as to block fluid flow The valve assembly also includes a member for rupturing the frangible member, a spring biasing the rupturing member into contact with the frangible member and a member for retaining the rupturing member away from the frangible member. A magnet is spaced apart from the retaining member, and a non-magnetic sleeve is disposed between the magnet and the retaining member. The non-magnetic sleeve blocks a magnetic field provided by the magnet. Also included is a trigger for removing the non-magnetic sleeve, wherein, when the non-magnetic sleeve is removed, in use, (Continued)

the magnetic field attracts the retaining member to release the rupturing member to cause rupture of the frangible member.

15 Claims, 2 Drawing Sheets

(52) U.S. Cl.
CPC ....... *F16K 31/084* (2013.01); *Y10T 137/0491* (2015.04); *Y10T 137/1759* (2015.04); *Y10T 137/1767* (2015.04)

(58) Field of Classification Search
CPC .............. F16K 17/1626; F16L 55/136; B64D 25/14; F17C 2205/032; F17C 13/06; F17C 2205/0314; F17C 2205/0329; F17C 2205/0323; B63B 2043/126; Y10T 137/0396; Y10T 137/0402; Y10T 137/0491; Y10T 137/1624–1767; Y10T 137/612; Y10T 137/6123
USPC ..... 137/14, 15.01, 15.18, 67–68.3; 222/3, 5; 441/40, 41, 83, 92, 93; 141/329, 330; 251/65; 193/25 B, 25 C
See application file for complete search history.

(56) References Cited

U.S. PATENT DOCUMENTS

| | | | |
|---|---|---|---|
| 6,260,570 B1 | 7/2001 | Wass et al. | |
| 7,178,547 B2 * | 2/2007 | Mackal | ...................... B63C 9/24 |
| | | | 137/68.3 |
| 7,380,755 B2 * | 6/2008 | Matsch | ................. B64C 1/1423 |
| | | | 244/137.2 |
| 7,854,347 B2 * | 12/2010 | Wang | ........................ B63C 9/24 |
| | | | 222/5 |
| 8,882,391 B2 * | 11/2014 | Stenzel | ................... B63B 21/66 |
| | | | 405/171 |
| 9,156,530 B2 * | 10/2015 | Best | .......................... B63C 9/19 |
| 2006/0124880 A1 | 6/2006 | King | |
| 2008/0289694 A1 | 11/2008 | Edwards | |
| 2015/0376986 A1 | 12/2015 | Taylor et al. | |

FOREIGN PATENT DOCUMENTS

| | | |
|---|---|---|
| CN | 207278467 U | 4/2018 |
| FR | 1422952 A | 1/1966 |
| JP | 2014119044 A | 6/2014 |
| WO | 2010141638 A1 | 12/2010 |

* cited by examiner

TRIGGER MECHANISM FOR A VALVE ASSEMBLY

FOREIGN PRIORITY

This application claims priority to European Patent Application No. 18461600.1 filed Aug. 17, 2018, the entire contents of which is incorporated herein by reference.

BACKGROUND OF THE INVENTION

Trigger valves may be used on highly compressed gas cylinders such as to rapidly inflate evacuation slides with gas when activated. Such valves can initiate a flow of gas from cylinder, through the valve, to a rubber slide. Ideally, trigger valves must be able to be opened quickly and reliably from a wide range of positions, and allow for rapid inflation of an evacuation slide. Known trigger valves can be complicated mechanisms with many metal parts providing many potential areas for failure, as well as making known valves heavy, bulky and expensive to manufacture.

There is therefore a need for a simple, lightweight and reliable trigger valve that can be operated from a variety of angles.

SUMMARY OF THE INVENTION

In one example, there is provided a valve assembly. The valve assembly includes a body defining a fluid flow path between an inlet and an outlet, and a frangible member disposed between the inlet and the outlet across the fluid flow path so as to block fluid flow between the inlet and the outlet. The valve assembly also includes a means for rupturing the frangible member to allow fluid flow between the inlet and the outlet and a means for biasing the rupturing means into contact with the frangible member to cause rupture of the frangible member. A means for retaining the rupturing means away from the frangible member is also provided, with a magnet that is spaced apart from the retaining means and a non-magnetic sleeve disposed between the magnet and the retaining means. The non-magnetic sleeve is configured to block a magnetic field provided by the magnet. The valve assembly further includes a means for removing the non-magnetic sleeve and, when the non-magnetic sleeve is removed, the magnetic field attracts the retaining means to release the rupturing means to cause rupture of the frangible member.

Preferably the retaining means may comprise a magnetic material.

Further, the valve assembly may further comprise a means for biasing the retaining means towards the rupturing means.

Preferably, the frangible member may be a membrane or a disk.

Further, the magnet may comprise a permanent magnet. Preferably, the magnet may comprise a neodymium magnet.

Preferably, the inlet may be configured to be disposed in fluid connection with a pressurised container containing a pressurised fluid. More preferably, the outlet may be configured to be disposed in fluid connection with an emergency slide.

Further, the rupturing means may be configured to move axially within the housing towards the frangible member.

The valve assembly may further comprise a trigger attached to the non-magnetic sleeve.

In another example, a method is provided. The method includes providing a fluid flow path from an inlet to an outlet and blocking the fluid flow path with a frangible member. The method further includes biasing a means for rupturing towards the frangible member, and retaining the means for rupturing away from the frangible member via a means for retaining and providing a magnet spaced apart from the retaining means. The method further includes blocking a magnetic field provided by the magnet by providing a non-magnetic sleeve between the magnet and the retaining means, removing the non-magnetic sleeve such that the magnetic field attracts the retaining means, releasing the rupturing means and rupturing the frangible member.

Preferably, the method may further comprise biasing the retaining means towards the rupturing means.

Further, the inlet may be provided in fluid communication with a pressurised container, and preferably, rupturing the frangible member may provide a fluid flow from the pressurised container to the outlet.

Preferably, the non-magnetic sleeve may be removed by a trigger.

DETAILED DESCRIPTION OF THE INVENTION

Whilst the valve assembly described herein will be described mainly in relation to an evacuation slide and the inflation thereof, it is also envisaged that this valve assembly may be used in other applications with regards to inflatable objects, such as any other kind of inflatable slide or other different self inflating solutions and applications e.g. life rafts and tires.

Figure 1A:
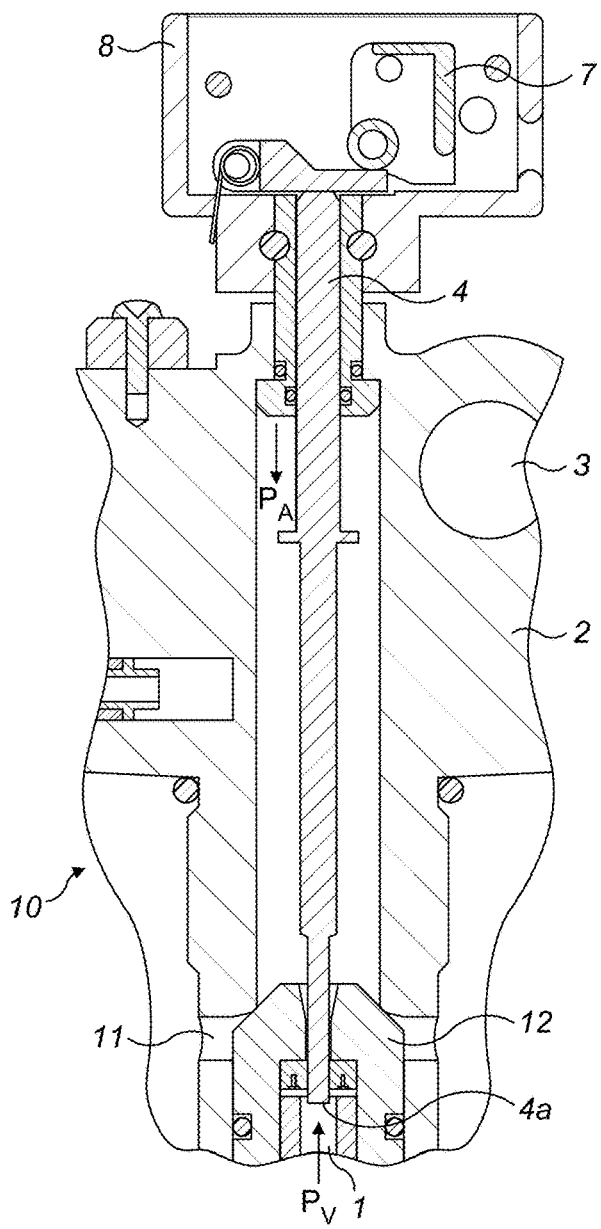
FIG. 1A is a cross-sectional view of a known trigger valve assembly.
Figure 1B:
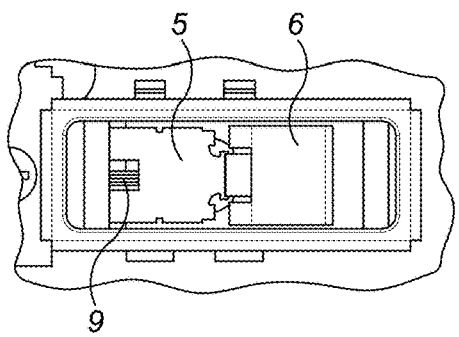
FIG. 1B is a top view of the known assembly of FIG. 1A.

One such known valve assembly is shown in FIGS. 1A and 1B. Valve assembly 10, in use, is mounted to a pressurised vessel containing pressurised fluid (not shown) that is used to inflate an evacuation slide, or other inflatable object (not shown). Pressurised fluid is in fluid communication with the valve assembly via an inlet 1 in a valve housing 2. A fluid channel from the pressurised fluid is formed through the valve between the inlet 1 and an outlet 3, the outlet 3, in use, being fluidly connected to the evacuation slide or other inflatable object.

When in a deflated state, the inflatable object is slowed and deflated and the fluid channel between the pressurised vessel and the inflatable object is closed by the valve assembly 10. As can be seen in FIG. 1A, in the closed position, an end 4a of a valve rod 4 sits in or across the inlet 1 and prevents gas flowing from the inlet 1 to the outlet 3. Generally, the pressure inside the pressurised vessel, $P_v$, is greater than the atmospheric pressure, $P_A$, which biases an insert 12 upwards and against the valve housing 2, providing a seal across side channels 11. Side channels 11 are in fluid communication with the pressurised fluid inside the pressurised vessel, but fluid is prevented from flowing through said side channels 11 and out the outlet 3 by the seal provided by the insert 12, and fluid is prevented from flowing from the pressurised vessel though the inlet 1 by the end 4a of the valve rod 4.

The valve rod 4 is held in the closed position across the inlet 1 and against the pressure $P_v$ of the pressurised fluid by means of a spring biased lever 5, which is secured in the closed position by a cam 6, which is in turn secured in position by a removable pin or lanyard 7. The lever 5, cam 6 and trigger lanyard 7 are all mounted in rotatable housing part 8, which can rotate relative to the valve rod 4. The rotation is necessary because the trigger lanyard 7 can only be pulled out in one direction but, as the evacuation slide is deployed and falls from the aircraft, it will tumble and take on different orientations—the housing part 8 will thus rotate so that the pin can always be pulled out at the required angle.

In the event of evacuation being required, an aircraft door (not shown) is opened and the deflated slide is ejected out of the door compartment. The trigger lanyard 7 is attached to the slide such that, as the slide falls out, the full weight of the slide pulling on the cam 6 causes the cam 6 to rotate and unlock the lever 5. The lever 5, under the bias of the lever spring 9, is then released thus, in turn, releasing the rod 4. The rod 4 is then moved axially (upwards in FIG. 1A), and out of the inlet 1. Pressurised fluid from inside the pressurised container may then flow through the inlet 1. This causes a reduction in the pressure difference between $P_v$ and $P_A$, thereby allowing the insert 12 to move down and break the seal provided between the insert 12 and the valve housing 2 across the side channels 11. Fluid may then flow from the pressurised vessel through the side channels 11, through the fluid channel and out of the outlet 3 into the slide, thereby inflating the slide.

Such a conventional trigger valve mechanism is complex, can be hard to manufacture and may require a large number of metal components and moving parts. The mechanism may therefore be heavy and have several different modes in which it can fail. It would therefore be beneficial to provide a lighter mechanism with fewer moving parts, and is easy to manufacture whilst maintaining the ability to be reliably triggered from a variety of different angles.

Figure 2:
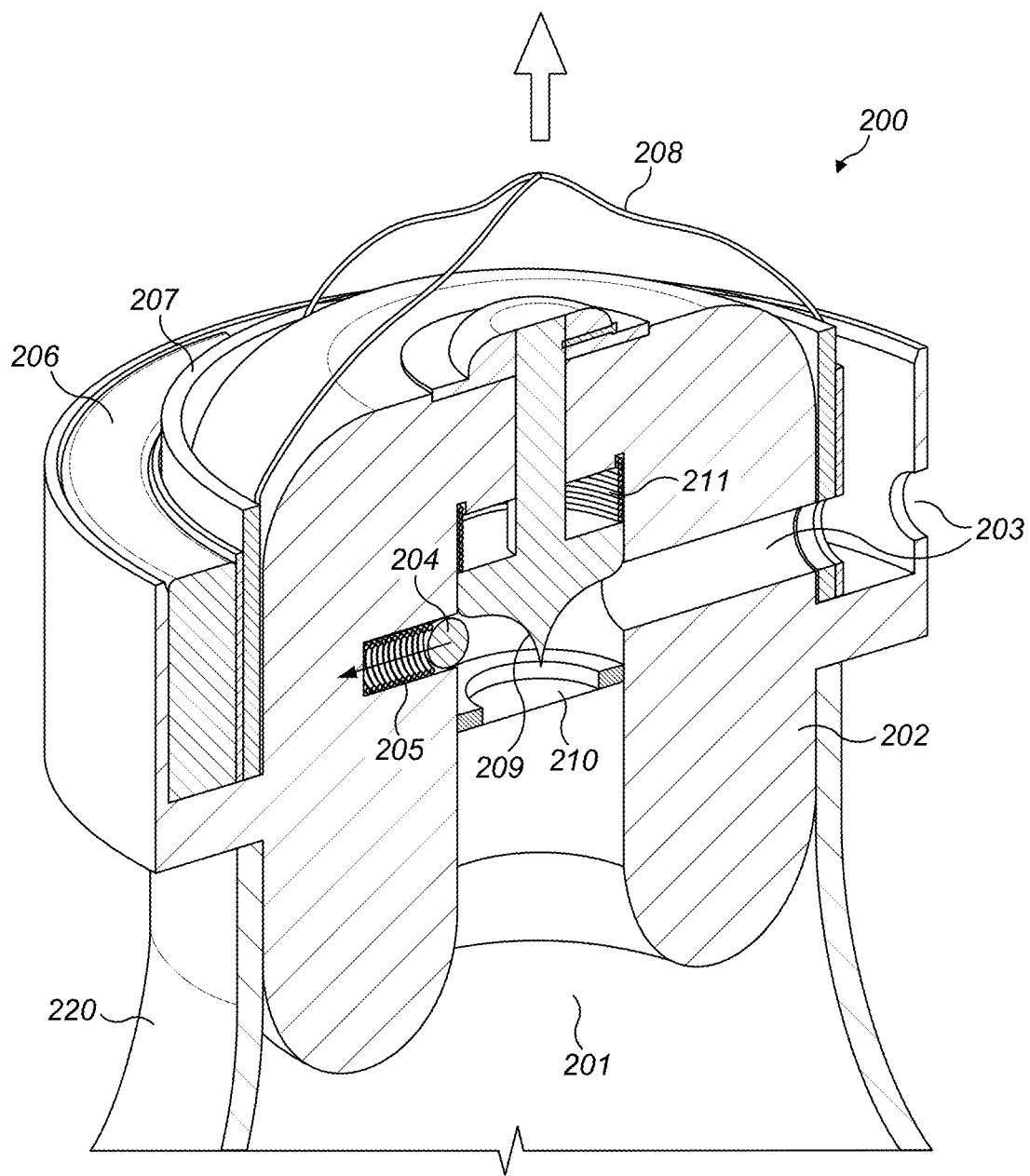
FIG. 2 is a perspective view of a valve assembly according to the present disclosure.

Referring now to FIG. 2, a valve assembly according to the present disclosure will now be described.

Valve assembly 200 may be provided with an inlet 201 in fluid connection with a pressurised container 220 containing a pressurised fluid (not shown). A body 202 of the valve assembly 200 defines a fluid flow path from the inlet 201 to an outlet 203 of the valve assembly 200.

In normal operation, i.e. when a fluid flow is not required, a membrane 210 of valve assembly 200 is provided between the inlet 201 and the outlet 203, blocking a flow of fluid from within the pressurised container 200 to the outlet 203 of the valve assembly 200.

The outlet 203 is defined from an area that is separated from the pressurised fluid of the pressurised container 220 by the membrane 210, through the body 202 of the valve mechanism 200, and may be attached to the evacuation slide or other inflatable object (not shown).

The valve assembly 200 further comprises a rupturing member 209 and rupturing member biasing means 211. Rupturing member biasing means 211 is configured to urge the rupturing member 209 towards the membrane 210, however the rupturing member 209 is prevented from moving towards the membrane 210 by a retention member 204. Retention member 204 may be urged towards rupturing member 209 and maintained in position by retention member biasing means 205. Retention member 204 may comprise a magnetic material such as nickel, steel or steel alloys.

Rupturing member biasing means 209 and retention member biasing means 205 may be a spring, or any other suitable biasing device.

Valve assembly 200 is provided with a magnet 206 spaced apart from retention member 204. Non-magnetic sleeve 207 is disposed between magnet 206 and retention member 204 and is configured to block the magnetic field provided by magnet 206. Non-magnetic sleeve 207 is connected to means for removing 208 the non-magnetic sleeve 207. In an example, the means for removing 208 is a trigger. In order to prevent accidental activation of the valve assembly 200, non-magnetic sleeve 207 may be temporarily held in place by providing a tight tolerance between the non-magnetic sleeve 207 and the body 202 of the valve assembly, or by the provision of a safety wire (not shown) holding the non-magnetic sleeve in place.

Magnet 206 may be a permanent magnet, such as a neodymium magnet. Non-magnetic sleeve 207 may be made from any material that blocks magnetic fields, such as zinc or copper.

When it is desired to open the valve and release the pressurised fluid within pressurised container 220 through the outlet 203, the non-magnetic sleeve 207 may be removed. The magnetic field provided by magnet 206 may then no longer be blocked, and as such attracts the retention member 204. The force of attraction provided by the magnetic field of magnet 206 on retention member 204 moves towards magnet 206 and out of the path of the rupturing member 209. When the retention member 204 is provided with retention member biasing means 205, the force of attraction provided by the magnetic field of magnet 206 on the retention member 204 is sufficient to overcome the biasing force of retention member biasing means 205, thereby moving retention member 204 out of the path of the rupturing member 209. For example, retention member 205 may move in the direction of magnetic force indicated by the arrow in FIG. 2. With retention member 204 no longer preventing movement of the rupturing member 209, rupturing member biasing means 211 urges the rupturing member into contact with the membrane 210, rupturing the membrane 210 and allowing pressurised fluid from the pressurised container 220 to flow therethrough.

When membrane 210 has been ruptured by the rupturing member 209, the pressure of the fluid within the pressurised container 220 may provide a force on the rupturing member that is greater than the force provided by biasing member 211, and therefore may force the rupturing member 209 up and out of the way of the flow path defined by the inlet 201 of the valve mechanism 200, the ruptured member 210 and the outlet 203 of the valve mechanism 200. Alternatively, the rupturing member 209 may be shaped such that, after rupturing the membrane 210, fluid may flow around or through the rupturing member 209, through the ruptured membrane 201 and out of the outlet 203 to the slide or other inflatable object (not shown).

By rupturing the membrane, a fluid flow path is provided from the pressurised container 220, through the inlet 201 of the valve mechanism 200, through the ruptured membrane 210 and through the outlet 203, which may be, in use, connected to the emergency slide (not shown).

Trigger 208 may be pulled out in a wide range of angles by any suitable means. For example, trigger 208 may be manually pulled, thereby removing the non-magnetic sleeve 207 from the valve assembly 200. In the case of an evacuation of an aircraft being required, and an emergency slide requiring inflation, an aircraft door (not shown) may be opened and the deflated slide ejected out of the door compartment. The trigger 208 may be attached to the slide such that as the slide falls out the full weight of the slide pulls the trigger 208, thereby removing the non-magnetic sleeve 207 from the valve mechanism 200. Other ways of pulling the trigger are also envisaged.

The valve mechanism 200 described herein provides a simpler valve with fewer moving parts than known trigger valves. This results in a valve that may be more easily manufactured, more reliable, lighter and more easily activated than known trigger valves.

Although this disclosure has been described in terms of preferred examples, it should be understood that these examples are illustrative only and that the claims are not limited to those examples. Those skilled in the art will be able to make modifications and alternatives in view of the disclosure which are contemplated as falling within the scope of the appended claims.

The invention claimed is:

1. A valve assembly comprising:
   a body defining a fluid flow path between an inlet and an outlet;
   a frangible member disposed between the inlet and the outlet across the fluid flow path so as to block fluid flow between the inlet and the outlet;
   means for rupturing the frangible member to allow fluid flow between the inlet and the outlet;
   means for biasing the rupturing means into contact with the frangible member to cause rupture of the frangible member;
   means for retaining the rupturing means away from the frangible member;
   a magnet spaced apart from the retaining means;
   a non-magnetic sleeve disposed between the magnet and the retaining means, the non-magnetic sleeve being configured to block a magnetic field provided by the magnet;
   means for removing the non-magnetic sleeve;
   wherein, when non-magnetic sleeve is removed, in use, the magnetic field attracts the retaining means to release the rupturing means to cause rupture of the frangible member.

2. The valve assembly of claim 1, wherein the retaining means comprises a magnetic material.

3. The valve assembly of claim 1, further comprising means for biasing the retaining means towards the rupturing means.

4. The valve assembly of claim 1, wherein the frangible member is a membrane or a disk.

5. The valve assembly of claim 1, wherein the magnet comprises a permanent magnet.

6. The valve assembly of claim 5, wherein the magnet comprises a neodymium magnet.

7. The valve assembly of claim 1, wherein the inlet is configured to be disposed in fluid connection with a pressurised container containing a pressurised fluid.

8. The valve assembly of claim 7, wherein the outlet is configured to be disposed in fluid connection with an emergency slide.

9. The valve assembly of claim 1, wherein the rupturing means is configured to move axially within the housing towards the frangible member.

10. The valve assembly of claim 1, further comprising a trigger attached to the non-magnetic sleeve.

11. A method, the method comprising:
    providing a fluid flow path from an inlet to an outlet;
    blocking the fluid flow path with a frangible member;
    biasing a means for rupturing towards the frangible member;
    retaining the means for rupturing away from the frangible member via a means for retaining;
    providing a magnet spaced apart from the retaining means;
    blocking a magnetic field provided by the magnet by providing a non-magnetic sleeve between the magnet and the retaining means;
    removing the non-magnetic sleeve such that the magnetic field attracts the retaining means, releasing the rupturing means; and
    rupturing the frangible member.

12. The method of claim 11, further comprising biasing the retaining means towards the rupturing means.

13. The method of claim 11, wherein the inlet is provided in fluid communication with a pressurised container.

14. The method of claim 13, wherein rupturing the frangible member provides a fluid flow from the pressurised container to the outlet.

15. The method of claim 12, wherein the non-magnetic sleeve is removed by a trigger.

* * * * *